United States Patent [19]
Nelson et al.

[11] Patent Number: 4,918,353
[45] Date of Patent: Apr. 17, 1990

[54] REFLECTOR AND LAMP COMBINATION

[75] Inventors: Clark D. Nelson, Mattoon, Ill.; Richard Malinowski, Chesterland, Ohio; Catherine Mers, Willoughby, Ohio; Diana Essock, Moreland Hills, Ohio; Vito Arsena, Highland Hts., Ohio; Mary Jaffe, Cleveland Hts., Ohio

[73] Assignee: General Electric Company, Schenectady, N.Y.

[21] Appl. No.: 366,336

[22] Filed: Jun. 13, 1989

Related U.S. Application Data

[63] Continuation of Ser. No. 138,416, Dec. 28, 1987, abandoned, which is a continuation-in-part of Ser. No. 101,928, Sep. 29, 1987, Pat. No. 4,835,439, and a continuation-in-part of Ser. No. 101,929, Sep. 29, 1987, Pat. No. 4,833,576.

[51] Int. Cl.⁴ ............................................. F21V 7/09
[52] U.S. Cl. .................................... 313/113; 362/297; 313/331; 106/75
[58] Field of Search ............... 313/110, 113, 114, 115; 362/226, 296, 310; 106/75, 84, 286.5, 286.8, 287.17, 287.29

[56] References Cited

U.S. PATENT DOCUMENTS

| Re. 25,630 | 8/1964 | Cook | 204/39 |
|---|---|---|---|
| 2,665,475 | 1/1954 | Campbell et al. | 148/6 |
| 2,673,945 | 3/1954 | Kaduk | 427/117 X |
| 2,804,406 | 8/1957 | Yntema et al. | 148/6 |
| 3,420,944 | 1/1969 | Holcomb | 174/50.64 |
| 3,532,591 | 10/1970 | Fosnocht | 427/120 X |
| 3,658,563 | 4/1972 | Washio et al. | 501/111 X |
| 3,725,698 | 4/1973 | Craig | 362/226 |
| 3,742,117 | 6/1973 | Levand, Jr. et al. | 313/332 X |
| 3,793,615 | 2/1974 | Hommonay et al. | 339/611 |
| 3,929,439 | 12/1975 | Pierce | 106/74 X |
| 4,015,165 | 3/1977 | Hardies | 313/318 |
| 4,021,659 | 5/1977 | Wiley | 240/41.36 |
| 4,169,238 | 9/1979 | English et al. | 313/113 X |
| 4,262,055 | 4/1981 | Russell et al. | 501/111 X |
| 4,366,255 | 12/1982 | Lankard | 106/104 X |
| 4,390,935 | 6/1983 | Audesse et al. | 362/226 X |
| 4,394,174 | 7/1983 | Tomic | 106/85 |
| 4,395,387 | 7/1983 | Goltz et al. | 423/305 |
| 4,403,276 | 9/1983 | Blaisdell | 362/263 X |
| 4,440,865 | 4/1984 | Salazar | 106/85 X |
| 4,482,942 | 11/1984 | Blaisdell et al. | 313/113 X |
| 4,522,926 | 6/1985 | Felice | 106/84 X |
| 4,539,509 | 9/1985 | Varshneya | 313/623 |
| 4,545,000 | 10/1985 | Fraley et al. | 362/297 X |
| 4,608,512 | 8/1986 | Rakitsch | 313/113 |
| 4,608,624 | 8/1986 | Blaisdell et al. | 362/226 |
| 4,677,338 | 6/1987 | Dixon et al. | 313/43 |
| 4,682,071 | 7/1987 | Thorpe | 313/43 |
| 4,728,849 | 3/1988 | Morris et al. | 313/113 |
| 4,749,902 | 6/1988 | Weiss | 313/332 |
| 4,755,712 | 7/1988 | Mujahid et al. | 313/331 |
| 4,766,346 | 4/1988 | Weiss et al. | 313/331 |
| 4,797,794 | 1/1989 | Connor et al. | 313/332 X |

FOREIGN PATENT DOCUMENTS 708614  8/1957  United Kingdom ............. 174/50.64

Primary Examiner—James J. Groody
Assistant Examiner—Mark R. Powell
Attorney, Agent, or Firm—Edward M. Corcoran; Stanley C. Corwin; Fred Jacob

[57] ABSTRACT

This invention relates to a glass reflector and tungsten-halogen lamp combination wherein the lamp is cemented into the glass reflector with an aluminum phosphate cement composition which comprise a mixture of aluminum phosphate containing excess phosphoric acid, relatively small particle size alumina and a mixture of relatively medium and coarse particle size inert filler materials and wherein the lamp contains a hermetic seal between quartz and a molybdenum foil with that portion of the foil in the seal area which is exposed to an oxidizing environment coated with alkali metal silicate.

16 Claims, 2 Drawing Sheets

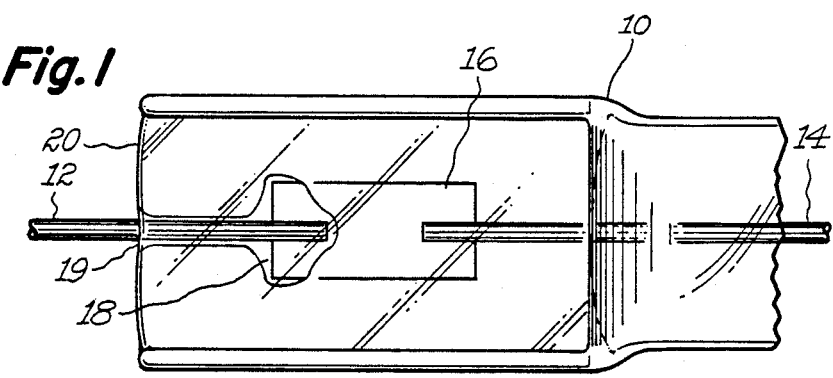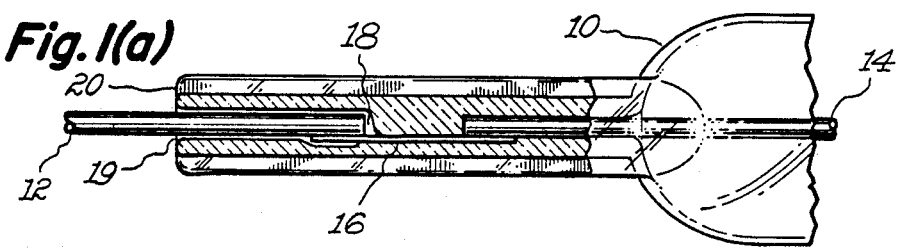

REFLECTOR AND LAMP COMBINATION

RELATED U.S. APPLICATION DATA

This application is a continuation of application Ser. No. 138,416, filed Dec. 28, 1987 now abandoned which is a continuation in-part application of U.S. Ser. Nos. 101,928 and 101,929 both filed on Sept. 29, 1987; now U.S. Pat. Nos. 4,835,439 and 4,833,576, respectively.

BACKGROUND OF THE INVENTION

1. Field of the Invention

This invention relates to a glass reflector and tungsten-halogen lamp combination. More particularly, this invention relates to a glass reflector and tungsten-halogen lamp combination wherein said lamp contains a quartz/molybdenum hermetic seal wherein the outer portion of said seal is coated with alkai metal silicate and wherein said lamp is cemented into said glass reflector with an aluminum phosphate cement.

BACKGROUND OF THE DISCLOSURE

High intensity linear types of lamps, such as the well-known tungsten-halogen lamps, are being used in ever greater numbers for a variety of commercial and consumer applications. A typical lamp of this type is disclosed in U.S. Pat. No. 4,021,659 which is the pioneer patent for a particular reflector-lamp assembly wherein the lamp is a tungsten halogen lamp having a quartz envelope which is cemented into an all glass reflector. The cement must be a refractory cement, because the temperature of the lamp envelope at the seal area which is cemented into a reflector often exceeds 350° C. In addition to being resistant to such high temperatures, the cement must also be electrically non-conducting, have the proper thermal conductivity and have a thermal coefficient of expansion which matches that of the reflector as closely as possible.

The use of molybdenum foil for effecting a hermetic seal with vitreous materials, such as pinch seals and vacuum-formed seals for quartz lamp envelopes, is old and well known to those skilled in the art. Molybdenum is an oxidation-sensitive material and oxidizes rapidly in an oxidizing environment such as air at temperatures of about 350° C. and higher. In the case of molybdenum foil used for hermetic pinch and vacuum-formed seals, this oxidation can result in an open circuit or can crack open the seal, either of which results in lamp failure. Most quartz-molybdenum hermetic seals are satisfactory up to a seal temperature of approximately 350° C. At temperatures of about 350° C. and higher, the rate of the oxidation reaction between the oxygen in the surrounding atmosphere and the molybdenum foil greatly increases and results in a substantial reduction in the useful life of lamps employing hermetic seals between molybdenum and a vitreous material. The oxidation reaction takes place, because during the sealing operation microscopic passage ways are formed around the lead wires as the vitreous material cools. The passageways or cracks permit oxygen to enter the foil area of the lamp seal.

These seals have always been a source of potential premature lamp failure and many attempts have been made to produce better seals. Efforts have been made in the past to prevent the oxidation of that portion of the molybdenum foil area which is exposed to atmospheric oxygen because of the passageways formed in the pinch seal.

In U.S. Pat. No. 4,015,165 a proposed solution to a problem of the oxidation of molybdenum outer current conductors of electric lamps having a quartz glass lamp envelope with a pinch seal consists of covering the molybdenum outer conductors with a coating or sleeve of oxidation resistant material, such as nickel plated brass. U.S. Pat. No. 4,539,509 discloses applying a sealing glass composition to the small space or passage between the outer leads and the quartz. The sealing glass becomes molten at temperatures above 350° C. and thereby forms a hermetic seal between the quartz and conductors. U.S. Pat. Nos. 3,420,944 and 3,793,615 relate to plating all or a portion of the foil with chromium.

More recent attempts to alleviate the oxidation problem of molybdenum foil seals exposed to air are disclosed in U.S. Pat. Nos. 4,677,338 and 4,682,071 which relate to both incandescent lamps and discharge lamps having quartz envelopes with substantially elongated stem portions for the pinch seal. The outer face or surface of the elongated seal area stem is highly polished or coated, ribbed, twisted or otherwise modified so that a portion of radiation incident upon it from the light source is directed away from the foil and adjacent region of the terminal conductor. This is done in order to reduce the temperature of the seal area at the outer portion and thereby reduce oxidation of the molybdenum. The '338 patent also states that lamp failure due to oxidation of the molybdenum can be a problem at temperatures as low as about 250° C.

Notwithstanding the above, a serious problem still exists with respect to preventing the oxidation of both molybdenum foil seals at the foil-air interface and molybdenum or molybdenum coated conductors or other objects exposed to an oxidizing environment at temperatures above about 350° C. Thus the need still exists for a practical and facile solution to the problem of such molybdenum oxidation.

SUMMARY OF THE INVENTION

The present invention relates to a reflector and lamp combination wherein said lamp comprises a vitreous envelope having a refractory metal inlead construction comprising a molybdenum foil portion sealed into at least one end thereof and extending into said vitreous envelope with the other end of said foil exposed to an oxidizing environment and having a coating of at least one alkali metal silicate, wherein said lamp is cemented into said reflector with an aluminum phosphate cement composition. The aluminum phosphate cement composition comprises a mixture of (i) aluminum phosphate which contains excess phosphoric acid, (ii) relatively small particle size alumina particles and (iii) a mixture of relatively medium and coarse particle size inert, refractory filler material. This cement is prepared by mixing an aqueous aluminum phosphate solution containing excess phosphoric acid with an aggregate mixture of said alumina particles and said inert filler particles to form a paste, followed by heating said paste at a temperature of at least about 250° C. for a time sufficient to form said cement. This cement composition is a bondable cement composition which has been found useful for cementing tungsten-halogen incandescent lamps having a vitreous envelope into glass reflectors to produce a lamp-reflector assembly of the type disclosed in U.S. Pat. No. 4,021,659. The aluminum phosphate solution is formed by reacting aluminum hydroxide with phosphoric acid. The aluminum phosphate solution will contain excess phosphoric acid so that the atomic ratio of phosphorus to aluminum is greater than about 3.

Applying at least one alkali metal silicate to that portion of the hermetic seal molybdenum inlead construction which is exposed to an oxidizing environment has resulted in seals of substantially improved oxidation resistance at elevated temperatures not exceeding about 600° C. Illustrative, but non-limiting examples of such suitable inlead constructions include those comprising (i) an outer terminal lead, an intermediate molybdenum sealing foil which forms a hermetic seal with said vitreous envelope and an inner lead extending into said envelope, wherein said inner and outer leads are connected to opposite ends of said sealing foil and (ii) those wherein the foliated molybdenum which forms the hermetic seal with the vitreous envelope is transverse to the leads, such as a molybdenum foil flange on a metal lead, wherein that portion of said molybdenum foil adjacent said outer terminal lead which is exposed to an oxidizing environment has been coated with at least one alkali metal silicate.

A preferred embodiment of the present invention relates to a reflector and lamp combination having improved life which comprises an all glass reflector member having a front reflecting portion terminating in an elongated hollow cavity portion and a lamp, such as a tungsten halogen lamp, permanently secured in said hollow cavity portion with the above identified aluminum phosphate cement so that its light source is positioned at about the focal point of said reflector member. The lamp will preferably comprise a quartz envelope having a refractory metal inlead construction pinch sealed into one end thereof and extending into said envelope, wherein said inlead construction comprises an outer terminal lead, an intermediate molybdenum sealing foil which forms a hermetic seal with said quartz envelope and an inner lead extending into said envelope wherein said inner and outer leads are connected to opposite ends of said sealing foil and wherein that portion of said molybdenum foil adjacent to said outer terminal lead which is exposed to an oxidizing environment is coated with at least one alkali metal silicate.

In a particularly preferred embodiment, the metal outer leads of the seal, preferably a refractory metal such as tungsten or molybdenum, will be coated or plated with a metal, such as nickel, which does not adhere to the quartz or other vitreous material. This has been found to provide a more facile path for an aqueous alkali metal silicate solution to penetrate into the seal area and coat the outer portion of the molybdenum foil seal.

BRIEF DESCRIPTION OF THE DRAWINGS

FIG. 1 is a view of a quartz envelope pinch seal containing a refractory metal inlead construction comprising a molybdenum sealing foil connected to an inner and outer lead.

FIG. 1(a) is a partial cut-away side view of FIG. 1.

DETAILED DESCRIPTION

Figure 2:
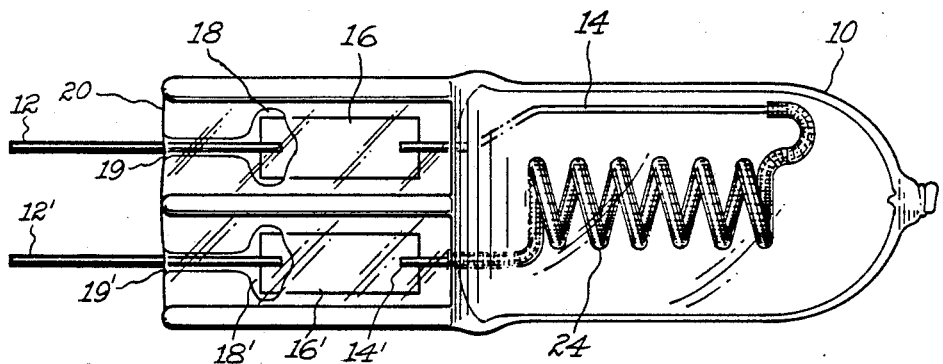
FIG. 2 is a view depicting a single ended tungsten-halogen lamp having two inlead constructions hermetically pinch sealed in a quartz envelope.

As set forth above, the aluminum phosphate cement composition of the present invention comprises a mixture of (i) aluminum phosphate which contains excess phosphoric acid (ii) relatively small particle size alumina particles and (iii) a mixture of relatively medium and coarse particle size inert refractory filler material. This cement is prepared by mixing an aqueous aluminum phosphate solution containing excess phosphoric acid with an aggregate mixture of said alumina and said inert filler material to form a paste or slurry, followed by heating said paste or slurry at a temperature of at least about 250° C. for a time sufficient to form said cement.

In preparing the aluminum phosphate solution, aluminum hydroxide is reacted with phosphoric acid merely by mixing the phosphoric acid and aluminum hydroxide. It is preferred that the acid employed for this reaction be chilled to a temperature below room temperature (i.e., about 40° F.) due to the reaction rate at room temperature. This helps to control the reaction and to avoid clumping of the AL(OH)$_3$. The phosphoric acid may be employed in the form of 85% phosphoric acid which is commercially available. Further, the phosphoric acid may be mixed with water prior to reacting same with aluminum hydroxide. Alternatively, the aluminum hydroxide may be slurried in water and the cool phosphoric acid added to the so-formed slurry. As a practical matter it has been found convenient to dilute the cold phosphoric acid with water and then add the aluminum hydroxide either in the form of powder or in the form of an aqueous slurry slowly to the diluted acid, with agitation, to disperse the Al(OH)$_3$ and then slowly warm the dispersion to form the aluminum phosphate solution. It will be appreciated that the particular method of forming the aluminum phosphate solution is left to the convenience of the practitioner.

The aluminum phosphate cement of the present invention is formed employing an aluminum phosphate solution containing excess phosphoric acid. It should be understood and will be apparent to those skilled in the art that the aluminum hydroxide does not necessarily have to be reacted with the phosphoric acid in the presence of excess phosphoric acid. The excess phosphoric acid may be added to the aluminum phosphate solution. By excess phosphoric acid is meant phosphoric acid in an amount such that the atomic or mole ratio of phosphorous or phosphate to aluminum exceeds 3. In general, the excess phosphoric acid may range from about 10-30 mole percent and more preferably from 12-20 percent. An optimum ratio of phosphorus from the phosphoric acid to the aluminum of the aluminum hydroxide has been found to be about 3.6.

Thus, the aluminum hydroxide may be reacted with phosphoric acid in the presence of such an excess amount of acid. Alternately, the aluminum hydroxide may be reacted with the phosphoric acid in an amount such that the ratio of phosphorus from the acid to the aluminum in the aluminum hydroxide is 3. The excess phosphoric acid may then be subsequently incorporated into the aluminum phosphate solution or may be mixed with one or more of the other ingredients of the composition which will be added to or to which will be added the aluminum phosphate solution. While not wishing to be held to any particular theory, it is believed that the excess phosphoric acid reacts with the alumina particles at elevated temperatures. If too little acid is employed in the cement composition of the present invention, the pre-cement paste or slurry will be unstable as reflected in low cement strength and decreased shelf life. On the other hand, if too much phosphoric acid is employed the reaction time at elevated temperature required to form the cement will increase excessively.

The aluminum phosphate solution will be slurried with the alumina particles and the mixture of coarse and fine particle size inert filler material. This may be accomplished in any convenient manner. The particular mixing sequence employed is not believed to be critical to forming the final slurry or paste which is subsequently heated to form the cement. Thus the particulate alumina and filler materials may be premixed in a dry state and added, with aggitation, to the aluminum phosphate solution to form a paste or slurry. Alternatively, the aluminum phosphate solution may be added to one or more of the particulate materials. Those skilled in the art will appreciate that the rheology of the final slurry or paste will, of course, be determined by the amount of excess acid present, the amount of water present, the amount of the aluminum phosphate solution present with respect to the powdered or particulate materials, the relative particle size of the powdered materials, etc. Thus, the actual amounts of the various ingredients with respect to each other employed in forming the aluminum phosphate cement of this invention may vary. The following Table, based on 100 volumes of total slurry or paste composition, illustrates the general and preferred ranges of the various ingredients to each other employed in forming the cement composition of this invention.

|  | Parts by Volume | |
|---|---|---|
|  | General | Preferred |
| Aluminum phosphate solution* | 10–25 | 12–20 |
| fine size particles (Al$_2$O$_3$) | 4–15 | 4–8 |
| medium size particles | 5–30 | 10–25 |
| coarse size particles | 40–75 | 50–70 |
| water | 15–75 | 25–60 |

Note:
*Based on reacting Al(OH)$_3$ with 85% H$_3$PO$_4$ in aqueous solution with no added H$_2$O.

In forming the cement composition of the present invention, the aluminum phosphate solution will be incorporated or mixed with relatively fine, medium and coarse particle size materials. The alumina will preferably comprise all or substantially all of the fine particle size material, although a small portion (i.e. less than about 20 volume percent) may be comprised of medium size particles. The broad and preferred particle size ranges expressed as mean particle size for the fine, medium and coarse particles are set forth in the Table below.

|  | Mean Particle Size in Microns | |
|---|---|---|
|  | Broad | Preferred |
| Coarse size particles | 16–46 | 18–42 |
| Medium size particles | 7–15 | 10–12 |
| Fine size particles | 1–4 | 1–2 |

It is particularly preferred that at least the medium and coarse particle size materials be generally spherical and not be in the form of needle-like or plate-like shapes. A more spherical particle size is important in achieving a more densely close-packed particle structure which has been found to be particularly useful in the cement composition of the present invention. The medium and coarse particle size filler materials should be inert in teh sense that they do not react at room temperature with the other ingredients of the slurry or paste from which the cement is formed. If the cement is to be employed in cementing a quartz lamp or quartz containing article into a reflector or other fixture, it is also preferred that all of the ingredients of the cement composition be relatively low in alkali metal content, such as sodium. In such applications it is preferred that the sodium content be below about 2 wt. % of the final cement.

The filler materials should also be refractory in the sense that they are not affected by the relatively high temperatures of 350°–600° C. which may be encountered in some lamp applications. The filler materials must also be relatively electrically non-conducting. The particular choice of filler materials employed will be determined by a number of factors, among which includes cost and thermal conductivity. When a cement composition of the present invention is to be used to cement a lamp such as a high intensity quartz-halogen lamp into an all glass reflector, the choice of the inert filler materials will be selected so as to achieve thermal conductivity characteristics of the cement which do not result in excessive thermal stresses to the reflector when the lamp is energized, which would ultimately result in cracking of the glass reflector. Thus a balance of thermal conductivity is required. If the thermal conductivity of the cement is too low, the temperature of the seal area of the lamp will be too high. Conversely, if the thermal conductivity is too high the glass reflector may crack. Among such materials that have been found useful in forming the cement composition of the present invention are included spheres made up of alumina silicate materials, solid and hollow glass spheres having a relatively low alkali metal content and barium titanate. Barium titanate has been found to be useful for adjusting the thermal conductivity of the final cement composition. However, it is understood to those skilled in the art that other inert filler materials may be employed in the spirit of the present invention.

Although it is believed that phosphoric acid reacts with alumina at temperatures as low as about 200° C. it is preferred that the paste or slurry of the present invention be cured at a temperature of at least about 240° C. and preferably at least about 250° C. in order to achieve a cement having satisfactory strength and which achieves a cure in a reasonable period of time. The aluminum phosphate cement composition of this invention is a refractory type cement and can withstand temperatures of and be cured at temperatures of 1,000° C. and higher. However, when used in the reflector and lamp combination of this invention, a practical upper limit for the cure of the cement will be dictated by adverse effects that may occur to the lamp or reflector. Lamp and reflector combinations of the type disclosed herein have been made in accordance with this invention curing the aluminum phosphate cement composition as high as 470° C. for about 7 minutes without incurring any noticeable adverse effects to the lamp or reflector. Thus, the cure temperature for the cement composition of the present invention may broadly range from about 240° to about 470° C. and more preferably from about 250°–470° C. The optimum temperature will depend upon the particular composition used. The cure time will generally be at least about 5 minutes and preferably at least about 7 minutes. Cement compositions of the present invention have been cured employing cure times ranging from about 5-20 minutes and preferably about 7-15 minutes at these temperatures.

As set forth above, oxidation of the molybdenum in hermetic seals between molybdenum and a vitreous material, such as quartz, at elevated temperatures and under oxidizing conditions has been a problem which continues to plague the lamp industry. It has now been found that applying alkali metal silicate to molybdenum exposed to an oxidizing environment at elevated temperature increases the oxidation resistance of the molybdenum. This represents a significant advance to the art, particularly as it applies to extending the useful life of electric incandescent and arc discharge lamps employing a hermetic seal between the vitreous material of the lamp envelope or arc tube and a molybdenum sealing foil.

By vitreous material is generally meant a material such as quartz or a relatively high temperature glass composition, such as aluminosilicate glasses. However, any vitreous material which will form a hermetic seal with molybdenum is suitable. By elevated temperature is meant a temperature of at least about 250° C., which is a temperature at which the oxidation of molybdenum can begin to be a problem. The elevated temperature may broadly range from about 250°-600° C. The rate at which molybdenum oxidizes has been found to significantly increase at a temperature of about 350° C. Accordingly, the present invention has been found to be particularly useful for increasing the oxidation resistance of molybdenum exposed to an oxidizing environment at temperatures in the range of about 350°-600° C. and has been found to significantly increase the useful life of lamps having hermetic seals between a molybdenum sealing foil and the vitreous material of the lamp envelope. The present invention has been found not to be effective at temperatures exceeding about 600° C.

Application of the alkali metal silicate to the molybdenum in the seal area may be accomplished in a facile manner simply by applying an aqueous solution of alkali metal silicate to the outer end of the seal. Wetting forces and capillary action act to cause the alkali metal silicate solution to penetrate into the cavity or cavities between the vitreous material and the refractory metal outer leads to wet and coat that portion of the molybdenum foil exposed to the oxidizing environment.

This can readily be understood by reference to FIGS. 1 and (1)a which are views of a typical quartz to molybdenum hermetic pinch seal. The hermetic seal comprises quartz envelope 10 having a refractory metal inlead construction pinch sealed into an end thereof, said inlead construction comprising an outer lead 12 and an inner lead 14 connected at opposite ends of molybdenum sealing foil 16. Because of a difference in thermal coefficient of expansion between the molybdenum and the quartz after the pinch seal has been formed and the quartz and metal components cool, an opening or cavity 18 (shown in an exaggerated manner for purposes of illustration) is formed between outer lead 12 and the quartz envelope. This cavity extends from the outer end 20 of the seal through to the outer end of molybdenum foil 16 due, at least in part, to the presence of the relatively thick outer lead attached to the relatively thin foil. In general, the diameter of outer and inner leads 12 and 14 will be in the order of about 30 mils, whereas the molybdenum foil generally has a thickness of less than about 2 mils, with the edges thereof etched to form a knife edge in order to effect a hermetic seal with the quartz envelope. Inner lead 14 may be connected to or form part of an electrode for an arc discharge lamp or can be connected to or form part of a filament, such as a tungsten filament, for a lamp such as a tungsten halogen lamp. Outer lead 12 may be covered with or connected to a thicker ferrule in order to provide the mechanical durability and strength needed to effect an electrical connection with a current source. An aqueous solution of alkali metal silicate may simply be applied to the outer face of the quartz envelope at the intersection 19 of the outer face 20 with outer lead 12 which is the outermost portion of cavity 18. As set forth above, a combination of wetting forces and capillary action cause the alkali metal silicate solution to penetrate into and fill cavity 18, thereby wetting and coating all of the exposed molybdenum. The alkali metal solution in the cavity may then be permitted to dry at ambient conditions or dried at elevated temperature.

As set forth above under SUMMARY OF THE INVENTION, in one embodiment of this invention the metal outer leads or outer lead wires will be coated or plated with a metal which does not adhere to the vitreous material of the lamp envelope (or arc tube) during the formation of the seal. This has been found to provide a more facile gap or opening between the outer lead and the surrounding vitreous material. One such suitable metal has been found to be nickel. Further, in some cases it has been found desireable to employ metal outer leads of a thickness substantially greater (i.e. $\geq 40$ mils) than a thickness of, i.e., about 30 mils which is typically used in such lamp construction, in combination with a coating of metal, such as nickel, which does not adhere to the quartz. This permits the alkali metal silicate solution to more readily and thoroughly coat the outer end of the molybdenum foil which is exposed to the atmosphere.

This latter embodiment of the present invention of employing relatively thick outer leads connected to the outer portion of the molybdenum sealing foil and preferably coating the leads with a material which does not adhere to the vitreous material of the lamp envelope runs contrary to the present practice of forming a pinch seal or vacuum seal as tightly as possible right up to and including the outer end of the seal. This is done in an attempt to make the outer portion of the seal area as airtight as possible. However, it has been found that some cracks or cavities invariably exist around the outer lead which admit air to the outer portion of the molybdenum sealing foil in the seal area.

FIG. 2 is a view of a typical tungsten-halogen lamp useful in the practice of this invention. The lamp comprises quartz envelope 10 containing two pinch-sealed inlead constructions comprising outer terminal leads 12 and 12' and inner terminal leads 14 and 14' connected to opposite ends of intermediate molybdenum sealing foils 16 and 16', respectively. Tungsten filament 24 is attached at one end to inner lead 14 and at the other end to inner lead 14'. The alkali metal silicate solution is applied at the outer end 20 of the lamp envelope 10 at the junction 19 and 19' of the outer leads 12 and 12', respectively. This results in the alkali metal silicate solution penetrating into the cavities 18 and 18' around outer leads 12 and 12' and the outer portion of intermediate molybdenum sealing foils 16 and 16'.

Although the illustrations referred to above are for pinch seals employing a molybdenum foil seal which is parallel to the longitudinal axis of the seal area, the present invention can also be used with other types of seals. Thus, U.S. Pat. No. 4,161,672 discloses that suitable hermetic seals may be vacuum formed. The invention is also useful with seals between molybdenum and a vitreous material wherein the molybdenum foil is mounted on a lead like a flange, transverse to the longitudinal direction of the seal. Illustrative, but non-limiting examples of such seals are disclosed, for instance, in U.S. Pat. Nos. 2,518,944; 2,607,981; 2,699,847; 2,630,471 and 3,664,180.

DESCRIPTION OF A PREFERRED EMBODIMENT

Figure 3:
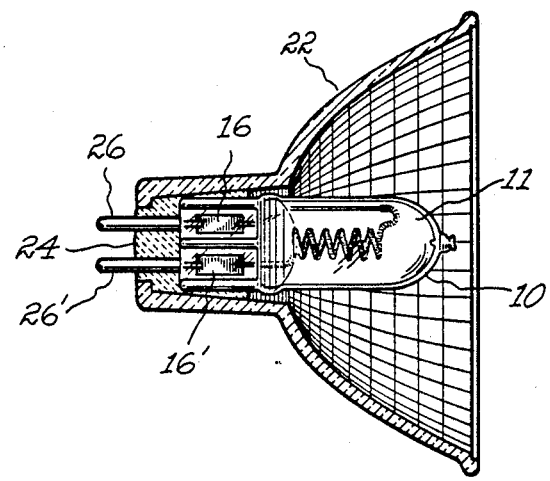
FIG. 3 is a view of a glass reflector and tungsten halogen lamp assembly wherein the lamp is cemented into the reflector employing the aluminum phosphate cement of the present invention.

FIG. 3 is a partial cut-away view of a reflector and lamp combination of the present invention, with the lamp being the type illustrated in FIG. 2. Thus, turning FIG. 3, molded glass reflector 22 contains tungsten-halogen lamp 11 cemented in said reflector by aluminum phosphate cement composition 24 of the present invention. Lamp 11 comprises quartz envelope 10 pinch sealed at one end thereof onto two refractory metal inlead constructions comprising intermediate molybdenum sealing foils 16 and 16' connected at one end to outer leads and at the other end to inleads which, in turn, are connected to the tungsten filament within the hollow portion of the quartz envelope. Ferrules 26 and 26' are connected to the outer leads and extend from the outer end of the pinch seal end of the lamp through the cement 30 which secures lamp 11 into reflector 22. The lamp 11 has had an aqueous solution of alkali metal silicate applied to the back end thereof prior to assembly in the reflector, at the position of the outer leads. This causes the solution to penetrate into the cavities (not shown) between the outer leads and the quartz envelope, such that said solution penetrates through and fills the voids (not shown) at the outer end of foils 16 and 16' to coat the outer portion of the molybdenum sealing foils 16 and 16' exposed in the cavity formed in the seal by the cooling of the vitreous envelope material when said vitreous material cools after the pinch seal process.

The lamp is cemented into the reflector employing a procedure which comprises first placing the lamp into the elongated rear portion of the reflector and securing same therein by introducing a first portion of cement paste or slurry into said rear portion using a syringe type of device. The initial fill of cement is then dried for about 1 minute in flowing hot air to dry the paste and achieve a slight degree of cure sufficient to set up the cement enough to permit further handling of the lamp-reflector assembly without dislodging or misaligning the lamp. A second fill of the same cement is applied to completely fill up the nose portion of the reflector. The assembly is placed in an oven at 110° C. and then heated up to a temperature of between 300°-350° C. over a time period of about 30 minutes and held at said 300°-350° C. temperature for a period of time of from 7-15 minutes in order to cure the cement. The cement formulation employed is set forth in the Table below.

|  | Vol % | Wt. % | mean particle size, microns |
| --- | --- | --- | --- |
| Aluminum phosphate solution (basis of 85% $H_3PO_4$ with no water added) | 15.8 | 11.3 | |
| Zeeospheres 850 | 23.6 | 18.8 | 42 |

-continued

|  | Vol % | Wt. % | mean particle size, microns |
| --- | --- | --- | --- |
| (coarse filler) | | | |
| Zeeospheres 800 | 47.2 | 37.7 | 12 |
| (medium filler) | | | |
| Barium titanate | 8.4 | 24.1 | 10 |
| (medium filler) | | | |
| Fired alumina | 5.1 | 8.1 | 2 |
| (fine particle size) | | | |
| | 100% | 100% | |

Water is added to the above formulation in an amount of 49 volumes of water per 100 volumes of paste or 19.6 parts by weight per 100 parts by weight of paste.

The aluminum phosphate solution is prepared by diluting chilled, 85% phosphoric acid with chilled, deionized water to which is added aluminum hydroxide with the resultant mixture agitated until the aluminum hydroxide is dispersed. The solution is then permitted to warm up to room temperature with mild agitation before being mixed with the other ingredients of the cement in order to effect reaction of the acid with the aluminum hydroxide. The following Table gives the components of the aluminum phosphate solution.

|  | Wt. % | Vol. % |
| --- | --- | --- |
| $Al(OH)_3$ | 12.6 | 8.1 |
| 85% $H_3PO_4$ | 67.3 | 60.8 |
| $H_2O$ | 20.1 | 31.1 |

To this solution is added the mixture of the particulate materials set forth in the immediately preceeding Table to form the cement paste which is used to cement the lamp into the reflector.

It should be understood that the foregoing references to the Figures, etc. are intended to be illustrative and non-limiting with respect to the scope of the invention. The invention will be further understood by reference to the examples below.

EXAMPLE 1

In this experiment eight (8) double ended tungsten-halogen lamps having a quartz envelope and pinch seals were used. The seals were vacuum formed to molybdenum foil connected at each end to molybdenum inner and outer lead wires. An aqueous solution of potassium silicate was applied to the outer end of each seal at the outer lead wire which resulted in the alkali metal silicate solution penetrating into the cavity between the quartz and outer lead through to the outer portion of the molybdenum foil seal. The alkali metal silicate solution appeared to fill up the cavity and wet the molybdenum in the cavity. The so-treated lamps were then dried in a furnace at 170° C. for 20 minutes.

The potassium silicate solution was an alkaline (pH of 11), low viscosity, water white, aqueous solution and contained 19.5% silicon dioxide as $SiO_2$ and 9.4% potassium oxide as $K_2O$. Thus the mole ratio of $SiO_2/K_2O$ in the solution was 3.25. This material was obtained from DuPont as their Potassium Silicate Electronics #200.

The treated, dried lamps were then placed in an oven at 450° C. and periodically examined. Out of eight lamps, one seal failure occurred after 871 hours. The test was discontinued after a total of 1479 hours at 450° C., with no further failures.

In marked contrast, another lamp of the same type which did not receive the potassium silicate solution treatment exhibited seal failure after only 143 hours at 450° C.

This experiment was repeated, but using an aqueous solution of 25 wt. % sodium silicate formed by dissolving sodium meta silicate ($Na_2SiO_3:9H_2O$) in distilled water. No signs of seal failure were observed after 350 hours at 450° C.

EXAMPLE 2

Another experiment was conducted similar to that of Example 1, except that the lamps were placed in a 600° C. oven. Four lamps were treated with the same potassium silicate solution and placed in a 600° C. oven, along with a control that did not have the potassium silicate solution applied to the seal area. The control exhibited seal failure after only 66 hours at 600° C. In contrast, none of the four treated lamps exhibited any seal failures after 1053 hours at 600° C., after which the test was discontinued.

EXAMPLE 3

In this experiment, a number of reflector and lamp assemblies of the type set forth in FIG. 3 and described in both the present application and in U.S. Pat. No. 4,021,659 were prepared and energized for accelerated life test performance. The lamps were 75 watt, quartz envelope, tungsten-halogen lamps of the type illustrated in FIG. 2 employing pinch seals over molybdenum foil connected to inner and outer leads, with one hundred lamps having 30 mil diameter molybdenum outer wire leads and one hundred and fifteen having 60 mil diameter, nickel plated, molybdenum outer leads. Prior to cementing the lamp into the glass reflector member, the potassium silicate solution of Example 1 was applied to the seal area of all of the lamps with the exception of nineteen lamps having the 30 mil outer lead wire which were used as controls. The lamps were air dried for 24 hours and/or baked for 15 min at 300° C. prior to being cemented into the reflectors. In some assemblies the cement used was a mixture of silica particles and potassium silicate solution, while others employed an aluminum phosphate cement of the present invention. The finished assemblies were energized for accelerated life test performance.

30 mil leads

The results for the lamps having the 30 mil leads and cemented into the glass reflectors with the silica/potassium silicate cement reflected a fairly wide scatter of the data. Those lamps that did not have the potassium silicate solution applied to the seal area exhibited an average life of about 1,000 hours. Those lamps that did have the potassium silicate solution applied to the seal area had an average life of 1,500 hours where the solution had been baked for 15 min. at 300° C. and about 1,800 hours where the potassium silicate solution had been permitted to air dry for 48 hours prior to being cemented into the lamp.

The lamps having 30 mil leads that were cemented into the glass reflectors with the aluminum phosphate cement exhibited an average life of only 400 hours when no potassium silicate solution had been applied to the seal area and an average life of about 1,500 hours for those lamps that had the solution applied and were baked for 15 min at 300° C. prior to being cemented into the glass reflectors. The average life of the lamps where the solution was air dried for 48 hours at room temperature before being cemented into the reflector was in excess of 2,000 hours, with three of the original eighteen lamps still burning after 3,500 hours.

mil nickel plated leads

The results for the lamps having the 60 mil nickel plated molybdenum outer leads were superior to the results obtained for the lamps having the 30 mil leads. Thus, for those lamps cemented into the glass reflectors with the silica/potassium silicate cement, of the lamps which did not have the potassium silicate solution applied to the seal area prior to assembly, two lamps out of an original group of eighteen were still burning after 3,200 hours. However, where the solution had been applied to the seal area, seventeen lamps out of original groups of nineteen and twenty were still burning after 3,200 hours.

The lamps that were cemented into the reflectors with the aluminum phosphate cement did not perform as well as those cemented with the silicate cement. Thus, the average life of a group of twenty lamps which did not receive the potassium silicate treatment to the seal area was only about 900 hours. The average life of lamps that had been treated with the potassium silicate solution was in excess of 2,000 hours for those lamps that failed in less than 3,200 hours, with five and eight lamps still burning after 3,200 hours out of initial groups of nineteen and twenty, respectively.

EXAMPLE 4-6

Reflector Stress Measurement

Different cement compositions were tested for their relative thermal conductivities by observing the thermal stresses produced in all-glass reflectors of lamp-reflector assemblies of the type disclosed in FIG. 3 (and in U.S. Pat. No. 4,021,659). For these tests, the lamp was a tungsten-halogen 360 watt type having a quartz envelope. The lamp burning environment contained a fan which constantly forced air over the lamps while they were burning and after they were turned off. After the lamps were turned off, the glass reflectors cooled quickly and unevenly by the air flow produced by the fan. This produced thermal stresses, both in tension and in compression, in the glass reflectors with the on-off cycling of the lamp. These thermal stresses sometimes caused the reflectors to fracture, with the magnitude of the stress dependent on how far into the strain range the glass was taken and how unevenly the glass was cooled. Thus the thermal conductivity of the cement is relatively important.

The lamps were cycled for 7½ minutes on and 7½ minutes off for 200 cycles, after which they were removed from their reflectors. The reflector nose was saw cut at approximately the top of the cement line and the saw cut piece placed face-up in immersion fluid and examined in a polyscope. The amount of tensile stress built up along the inside of the nose surface was calculated from the following formula:

$$\text{Stress (psi)} = \frac{17.3 \times 0}{t \times b}$$

O = Degrees of analyzer rotation
B = Stress optical coefficient
t = Viewed optical path length (inches)

EXAMPLE 4

In this experiment, a cement composition was prepared following the procedure described under DESCRIPTION OF THE PREFERRED EMBODIMENT, with the cement composition being as set forth in the Table below.

|  | Vol. % | Wt. % | mean particle size, microns |
|---|---|---|---|
| Aluminum phosphate solution (basis of no water added) | 14.8 | 11.3 |  |
| Zeeospheres 850 (coarse filler) | 66.0 | 56.4 | 42 |
| Al$_2$O$_3$ (medium particle size) | 14.4 | 24.2 | 11 |
| Fired Al$_2$O$_3$ (fine particle size) | 4.8 | 8.1 | 2 |
|  | 100 | 100 |  |

H$_2$O was added to above in an amount of 58.1 volumes per 100 volumes of above or 24.9 parts by wt. per 100 parts by wt. of above. The composition of the aluminum phosphate solution (without the water) was the same as that given under the DESCRIPTION OF THE PREFERRED EMBODIMENT and was prepared in the same manner. The Zeeospheres are hollow silica-alumina ceramic spheres available from Zeelan Industries, Inc. of St. Paul, Minn. The fired alumina was obtained by firing aluminum hydroxide. The medium particle size alumina (Al$_2$O$_3$) was obtained from The Aluminum Company of America (ALCOA) as their Al6SG superground alumina.

The so-formed pre-cement paste was employed to cement twenty of the 350 watt lamps into all glass reflectors as shown in FIG. 3 employing the two-step process of injecting cement followed by the curing procedure set forth under DETAILED DESCRIPTION. Accelerated life tests were conducted employing the procedure set forth above for the stress test, but with cycles of 15 minutes on and 15 minutes off for a total burning time of 75 hours or total test time of about 150 hours.

The results of the life test were that the reflectors had cracked in 18 out of 20 of the reflector-lamp assemblies. Stress tests were also conducted and the stress build up in the reflectors had a value of about 290 psi.

EXAMPLE 5

This example was similar to Example 1, except that the composition of the cement paste was that set forth in the Table below.

|  | Vol % | Wt. % | mean particle size, microns |
|---|---|---|---|
| Aluminum phosphate solution (basis of no added water) | 15.8 | 11.3 |  |
| Zeeospheres 850 (coarse filler) | 23.6 | 18.8 | 42 |
| Zeeospheres 800 (medium filler) | 47.2 | 37.7 | 12 |
| Barium titanate (medium filler) | 8.4 | 24.1 | 10 |
| Fired Alumina (fine particle size) | 5.1 | 8.1 | 2 |
|  | 100.0% |  |  |

The above composition contained water in an amount of 49.1 volumes of water per 100 volumes of above or 19.6 parts of water by weight per 100 parts by weight of above.

This cement paste was used with the same lamps and reflectors and following the same procedure as in Example 4. The results of the life tests with 20 lamps were that 15% of the reflectors cracked. The stress level was not measured.

EXAMPLE 6

This example was also similar to that of Example 4 except that the cement paste had the following composition.

|  | Vol. % | Wt. % | mean particle size, microns |
|---|---|---|---|
| Aluminum phosphate solution (basis of no added water) | 17.8 | 11.2 |  |
| Potters 3000 E Glass Spheres (coarse filler) | 65.1 | 57.0 | 30 |
| Barium titanate (medium filler) | 11.3 | 23.9 | 10 |
| Fired Alumina (fine size) | 5.7 | 8.0 | 2 |
|  | 99.9 | 100.0 |  |

Added H$_2$O was 28.4 volumes per 100 volumes of above.

The glass spheres are solid glass spheres and were obtained from Potters Industries, Inc. of Hasbrouck Hts., N.J.

In this experiment, less than 3% of the glass reflectors cracked in the life test. Stress build-up was determined in the stress test to be on the order of about 50 psi.

What is claimed is:

1. A reflector and lamp combination comprising (a) a vitreous reflector member having a front reflecting portion terminating in an elongated hollow cavity portion which protrudes rearwardly from said reflector member and (b) a tungsten-halogen lamp permanently secured in said hollow cavity portion with an aluminum phosphate cement comprising a mixture of (i) aluminum phosphate containing excess phosphoric acid, (ii) relatively small particle size alumina particles and (iii) a mixture of relatively medium and coarse particle size inert refractory filler material, wherein said tungsten-halogen lamp comprises a vitreous envelope having at least one metal inlead construction hermetically sealed in at least on end thereof and extending into said end thorough at least one opening extending into said envelope wherein said inlead construction comprises an outer metal lead, an intermediate molybdenum sealing foil which forms said hermetic seal with said vitreous envelope and an inner lead extending into said envelope, said inner and outer leads being connected to said sealing foil, wherein the surface portion of said sealing foil which is adjacent said outer terminal lead is exposed to an oxidizing environment and has been coated with an aqueous solution of alkali metal silicate.

2. The combination of claim 1 wherein the mole ratio of phosphate to aluminum in said aluminum phosphate is greater than 3.

3. The combination of claim 2 wherein said envelope is quartz or a high temperature glass.

4. The combination of claim 3 comprising on a parts by volume bases (i) 4–15 parts of alumina, (ii) 5–30 parts of medium size filler, (iii) 40–75 parts of coarse size filler, and (iv) 10–25 parts of said aluminum phosphate taken as the total reaction product of reacting aluminum hydroxide with 85% phosphoric acid.

5. The combination of claim 4 comprising (i) alumina having a mean particle size ranging between about 1–4 microns, (ii) medium size filler particles having a mean particle size ranging between about 7–15 microns and (iii) coarse particle size filler particles having a mean particle size ranging between about 16–46 microns.

6. The combination of claim 5 wherein said inner and outer metal leads comprise refractory metal.

7. The combination of claim 6 wherein said outer lead is coated with a metal which does not adhere to said lamp envelope.

8. A reflector and lamp combination comprising (a) a vitreous reflector member having a front reflecting portion terminating in an elongated hollow cavity portion which protrudes rearwardly from said reflector member and (b) a tungsten-halogen lamp permanently secured in said hollow cavity portion with an aluminum phosphate cement so that its light source is positioned at about the focal point of said reflector member, said tungsten-halogen lamp comprising a vitreous envelope having at least one refractory metal inlead construction hermetically sealed into at least one end thereof and extending into said end through an opening extending into said envelope wherein said inlead construction comprises an outer terminal lead, an intermediate molybdenum sealing foil which forms said hermetic seal with said vitreous envelope and an inner lead extending into said envelope, said inner and outer leads being connected to opposite ends of said sealing foil and wherein the surface of that portion of said molybdenum foil adjacent said outer terminal lead is exposed to an oxidizing environment and has been coated with an aqueous solution of alkali metal silicate and wherein said aluminum phosphate cement comprises, on a parts by volume basis based on 100 volumes of mixture (i) 4–15 parts of alumina, (ii) 5–30 parts of medium size filler, (iii) 40–75 parts of coarse size filler, and (iv) 10–25 parts of aluminum phosphate taken or expressed as the total reaction product of reacting aluminum hydroxide with 85% phosphoric acid with no added water and containing excess phosphoric acid so that the atomic or mole ratio of phosphorus to aluminum exceeds about 3.

9. The combination of claim 7 wherein said alkali metal comprises sodium.

10. The combination of claim 8 wherein said alkali metal consists essentially of potassium.

11. A reflector and lamp combination comprising (a) a vitreous reflector member having a front reflecting portion terminating in an elongated hollow cavity portion which protrudes rearwardly from said reflector member and (b) a tungsten-halogen lamp permanently secured in said hollow cavity portion with an aluminum phosphate cement so that its light source is positioned at about the focal point of said reflector member, said tungsten-halogen lamp comprising a vitreous envelope having at least one refractory metal inlead construction hermetically sealed into at least one end thereof and extending into said end through an opening extending into said envelope wherein said inlead construction comprises an outer terminal lead, an intermediate molybdenum sealing foil which forms said hermetic seal with said vitreous envelope and an inner lead extending into said envelope, said inner and outer leads being connected to opposite ends of said sealing foil and wherein the surface of that portion of said molybdenum foil adjacent said outer terminal lead is exposed to an oxidizing environment and is coated with alkali metal silicate and wherein said aluminum phosphate cement comprises, on a parts by volume basis (i) 4–15 parts of alumina, (ii) 5–30 parts of medium size filler, (iii) 40–75 parts of coarse size filler, and (iv) 10–25 parts of aluminum phosphate taken as the total reaction product of reacting aluminum hydroxide with 85% phosphoric acid.

12. The combination of claim 8 comprising (i) alumina having a mean particle size ranging between about 1–4 microns, (ii) medium size filler particles having a mean particle size ranging between about 7–15 microns and an (iii) coarse particle size filler particles having a mean particle size ranging between about 16–46 microns.

13. The combination of claim 9 wherein said inner and outer metal leads comprise refractory metal.

14. The combination of claim 8 wherein said mole ratio of said phosphate to said aluminum and said aluminum phosphate exceeds 3 by an amount of from 10–30 mole %.

15. The combination of claim 8 wherein said alkali metal of said alkali metal silicate comprises potassium.

16. The combination of claim 8 wherein said alkali metal of said alkali metal silicate consists essentially of potassium.

* * * * *